United States Patent [19]
Maruyama et al.

[11] Patent Number: 5,478,210
[45] Date of Patent: Dec. 26, 1995

[54] MULTI-STAGE VACUUM PUMP

[75] Inventors: Teruo Maruyama, Hirakata; Akira Takara, Higashiosaka, both of Japan

[73] Assignee: Matsushita Electric Industrial Co., Ltd., Osaka, Japan

[21] Appl. No.: 325,979

[22] Filed: Oct. 21, 1994

Related U.S. Application Data

[63] Continuation of Ser. No. 11,313, Jan. 29, 1993, abandoned.

[30] Foreign Application Priority Data

Jan. 31, 1992 [JP] Japan ................................. 4-016044
Mar. 31, 1992 [JP] Japan ................................. 4-076470

[51] Int. Cl.$^6$ ........................... F04B 23/12; F04B 35/04
[52] U.S. Cl. ................... 417/203; 417/205; 417/247; 417/423.4; 417/266; 418/9
[58] Field of Search ..................... 417/199.1, 201, 417/203, 205, 247, 423.4, 266; 418/9; 415/90

[56] References Cited

U.S. PATENT DOCUMENTS

| | | |
|---|---|---|
| Re. 17,689 | 6/1930 | Hibbard . |
| 2,243,874 | 6/1941 | Lysholm . |
| 2,640,428 | 6/1953 | Houghton . |
| 3,639,087 | 2/1972 | Frohbieter . |
| 3,807,911 | 4/1974 | Caffrey ........................................ 418/9 |
| 3,811,805 | 5/1974 | Moody, Jr. et al. . |
| 4,152,092 | 5/1979 | Swearingen . |
| 4,420,291 | 12/1983 | Winstead . |
| 4,504,201 | 3/1985 | Wycliffe ...................................... 418/9 |
| 4,601,643 | 7/1986 | Seidel ..................................... 417/247 |

(List continued on next page.)

FOREIGN PATENT DOCUMENTS

| | | |
|---|---|---|
| 0221003 | 5/1987 | European Pat. Off. . |
| 0256234 | 6/1987 | European Pat. Off. . |
| 0230868 | 8/1987 | European Pat. Off. . |
| 0340658 | 4/1989 | European Pat. Off. . |
| 0382029 | 8/1990 | European Pat. Off. . |
| 0435291 | 12/1990 | European Pat. Off. . |
| 3153474 | 6/1973 | Germany . |
| 3230550 | 1/1984 | Germany . |
| 60-259791 | 12/1985 | Japan . |
| 62314056 | 6/1989 | Japan . |
| 237384 | 9/1989 | Japan ......................................... 418/9 |
| 111690 | 5/1991 | Japan ......................................... 418/9 |
| 809445 | 2/1959 | United Kingdom . |
| 2123089 | 1/1984 | United Kingdom . |

OTHER PUBLICATIONS

"A Generalized Performance Computer Program for Oil Flooded Twin–Screw Compressor", Pawan J. Singh and Ghanshyam C., Patel, Ingersoll–Rand Research, Inc. Princeton, N.J., 1984, pp. 544–553.
"Computer Modeling For Performance Analysis of Rotary Screw Compressor: Mitsuru Fijiwara and Katsuhiko Kasuya, Mechanical Engineering Research Laboratory", Hitachi, Ltd., Ibaraki, Japan, 1984, pp. 536–543.
"A New Molecular Pump:, Louis Maurice, Proc. 6th Interl. Vacuum Congr. 1974 Japan", J. Appl. Phnys, Suppl. 2, Pt. 1, 1974.
Patent Abstracts of Japan "Multichannel Type Vacuum Pump", vol. 13, No. 225 (M–830) [357], May 25, 1989.

*Primary Examiner*—Richard A. Bertsch
*Assistant Examiner*—Roland G. McAndrews, Jr.
*Attorney, Agent, or Firm*—Wenderoth, Lind & Ponack

[57] ABSTRACT

A vacuum pump includes a plurality of rotors accommodated in a housing, a plurality of bearings for supporting the shafts of the rotors, respectively, a fluid-suction opening and a fluid-discharge opening formed in the housing, and a motor for driving at least one of the rotors. The pump has a first pump structure section for suction and discharge of gas, the pressure of which is in a viscous flow region, by utilizing change in volume of a space formed by the rotors and the housing. A second pump structure section is provided for transporting gas, a pressure of which is in an intermediate flow region, and gas, the pressure of which is lower than a pressure of the intermediate flow region, by utilizing movement of the space from a suction side to a discharge side of the second pump structure section.

15 Claims, 12 Drawing Sheets

U.S. PATENT DOCUMENTS

| | | |
|---|---|---|
| 4,625,156 | 11/1986 | Komiya et al. . |
| 4,712,048 | 12/1987 | Rebsamen . |
| 4,758,132 | 7/1988 | Hartwig . |
| 4,797,068 | 1/1989 | Hayakawa et al. . |
| 4,808,077 | 2/1989 | Kan et al. . |
| 4,829,217 | 5/1989 | Kameyama et al. . |
| 4,850,806 | 7/1989 | Morgan et al. . |
| 4,878,813 | 11/1989 | Miki ......... 417/247 |
| 5,040,949 | 8/1991 | Crinquette et al. ...... 417/205 |
| 5,062,771 | 11/1992 | Satou et al. . |
| 5,092,740 | 3/1992 | Yamamura ............ 417/423.4 |
| 5,115,172 | 5/1992 | Ishii et al. . |
| 5,118,251 | 6/1992 | Saulgeot ................. 417/203 |
| 5,166,566 | 11/1992 | Bernhardt et al. . |
| 5,197,861 | 3/1993 | Maruyama et al. ..... 417/205 |

Fig.7
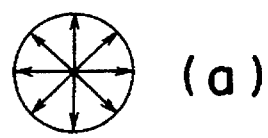 (a)
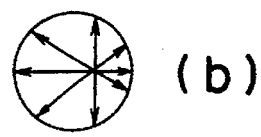 (b)
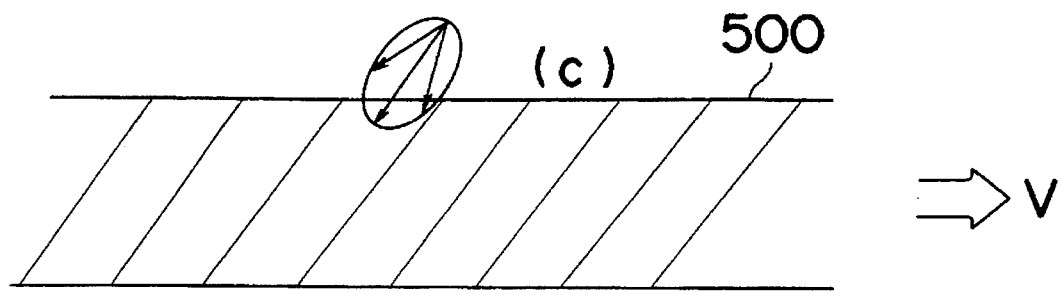
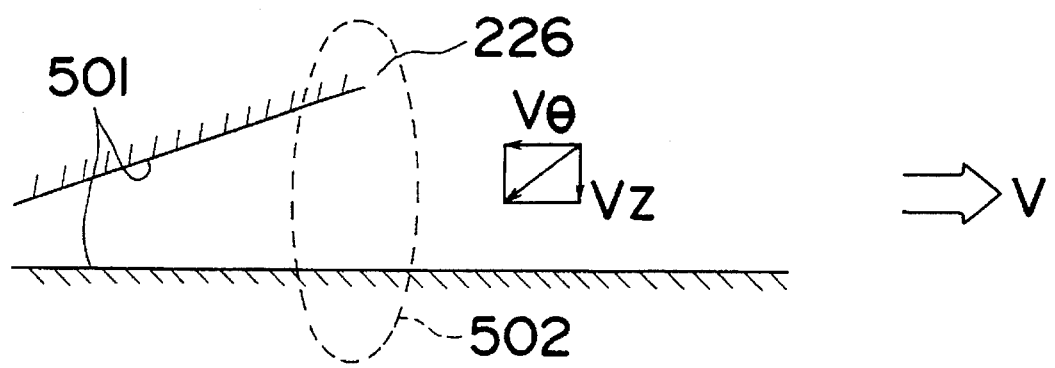

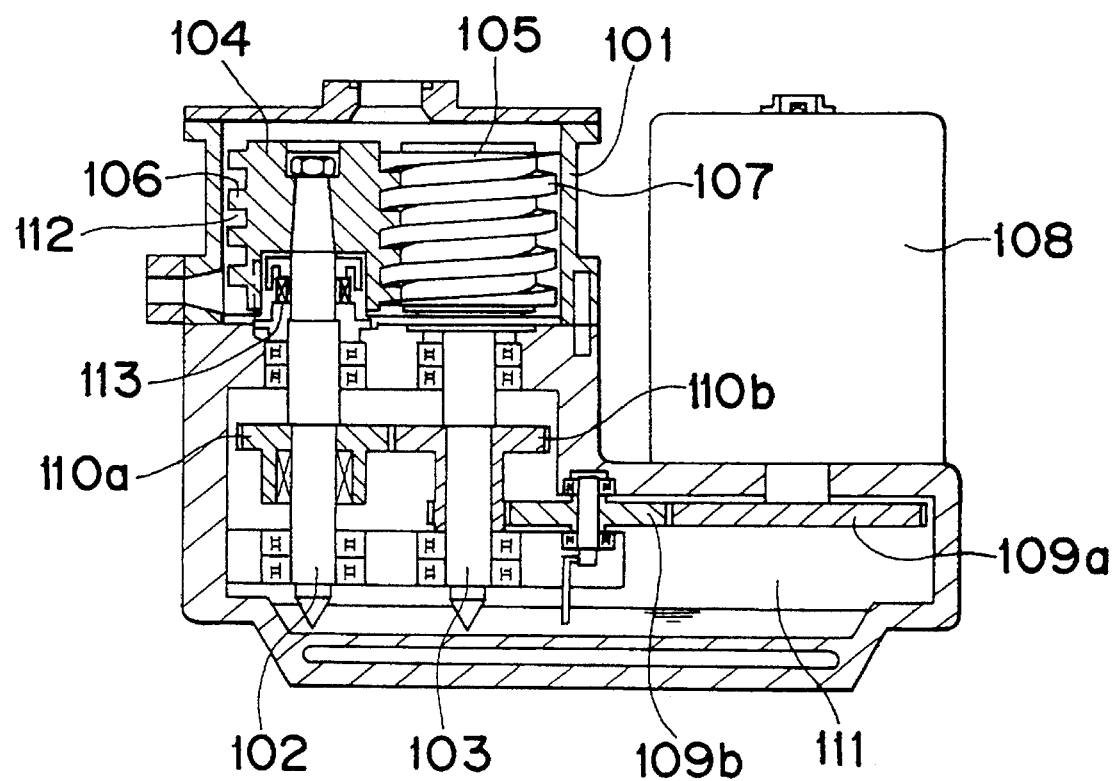
Fig. 11 - PRIOR ART

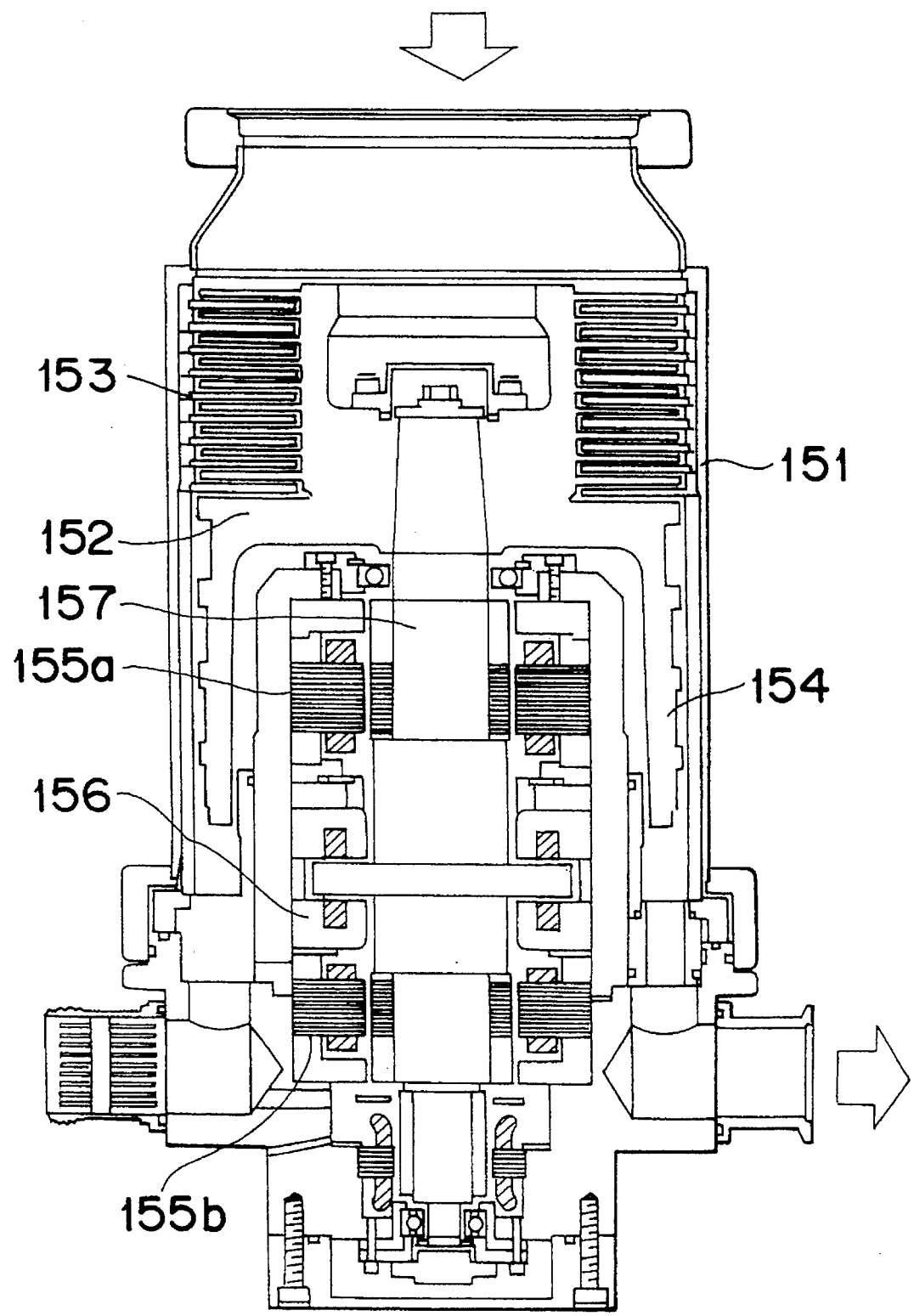
Fig.12 - PRIOR ART

Fig. 13 - PRIOR ART
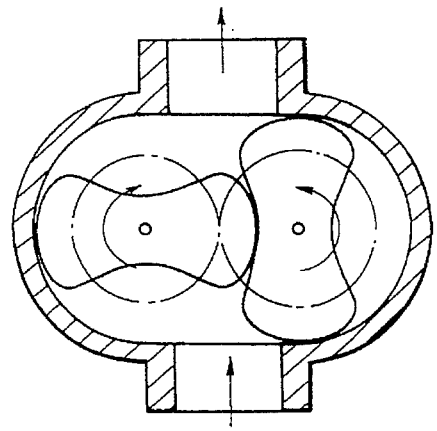
Fig. 14 - PRIOR ART
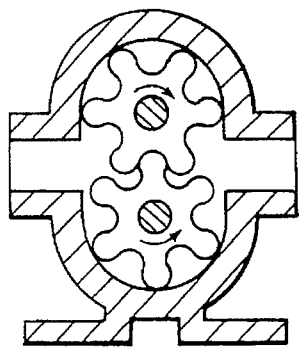
Fig. 16 PRIOR ART
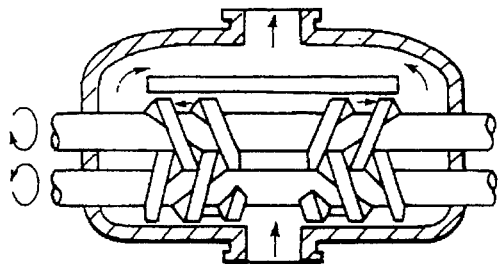
Fig. 15A PRIOR ART
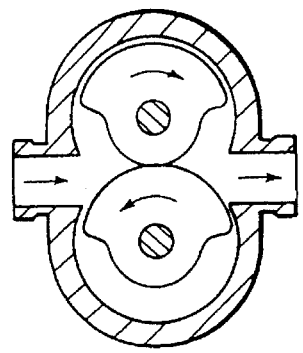
Fig. 15B - PRIOR ART
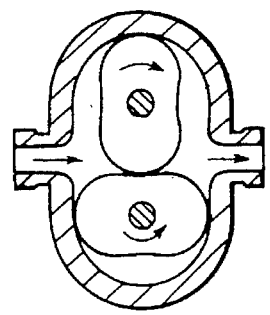
Fig. 17 PRIOR ART
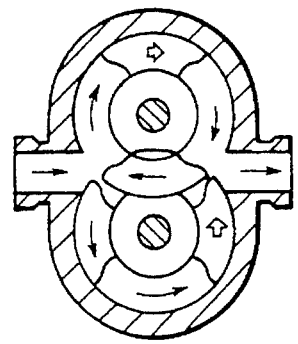

MULTI-STAGE VACUUM PUMP

This application is a continuation of now abandoned application, Ser. No. 08/011,313, filed Jan. 29, 1993.

BACKGROUND OF THE INVENTION

The present invention relates to a vacuum pump to be used to discharge gas from a vacuum chamber installed on equipment for manufacturing semiconductors.

A vacuum pump for generating a vacuum environment is indispensable for use with a CVD apparatus, a dry etching apparatus, a sputtering apparatus, an evaporating apparatus or the like. In recent years, the development of a vacuum pump having a high operational performance is more and more strongly demanded because the process of manufacturing semiconductors must be clean and a high vacuum must be generated.

In order to generate a high vacuum, the semiconductor-manufacturing equipment is provided with an evacuating system comprising a roughing vacuum pump (positive-displacement vacuum pump) and a turbo-molecular pump. The roughing vacuum pump generates a certain degree of vacuum from atmospheric pressure and then, the turbo-molecular pump generates a predetermined high vacuum.

FIG. 11 shows an example of a screw type vacuum pump classified as a conventional positive-displacement vacuum pump (roughing vacuum pump). The screw type vacuum pump comprises a housing 101; a first rotary shaft 102; a second rotary shaft 103; cylindrical rotors 104 and 105 supported by the rotary shafts 102 and 103, respectively; and thread grooves 106 and 107 formed on the peripheral surface of each of the rotors 104 and 105. That is, the first rotary shaft 102 and the second rotary shaft 103, which are parallel with each other, are accommodated in the housing 101. The rotors 104 and 105 are mounted on the first and second rotary shafts 102 and 103, respectively. Thread grooves 106 and 107 are respectively disposed on the rotors 104 and 105 to form the projections and recesses thereof. A space is formed between the thread grooves 106 and 107 by the engagement between the groove of the thread groove 106 and the thread of the thread groove 107 and between the thread of the thread groove 106 and the groove of the thread groove 107. As a result of the rotations of the rotors 104 and 105, the volume of the space changes and thus suction and discharge operations can be performed.

FIG. 12 shows a thread groove type turbo-molecular pump, having a turbine blade, classified as a conventional kinetic vacuum pump. The vacuum pump comprises a housing 151; a cylindrical rotor 152; a turbine blade 153; a thread groove 154; magnetic radial bearings 155a and 155b for supporting a rotary shaft 157; and a magnetic thrust bearing 156. In this construction, the rotor 152 is accommodated in the housing 151. The turbine blade 153 is disposed in an upper portion of the rotor 152. The thread groove 154 is disposed on a lower portion of the rotor 152. Directivity is applied to gas molecules in the motion thereof by the high-speed rotation of the turbine blade 153 (bucket) and the thread groove 154. In this manner, the turbo-molecular pump performs a pumping operation. More specifically, the turbine blade 153 having discharging performance in a molecular flow region of a low pressure is disposed on the suction side of the vacuum pump, and the thread groove 154 having discharging performance in a viscous flow region of a high pressure is disposed on the discharge side. In this manner, a vacuum can be generated over a wide range.

The above-described vacuum pumps and the evacuating system comprising the vacuum pumps have, however, the following drawbacks:

(1) Drawback of roughing vacuum pump (positive-displacement vacuum pump)

In the screw type vacuum pump as shown in FIG. 11, timing gears 110a and 110b are provided to rotate the rotors 104 and 105 synchronously. That is, the rotation of a motor 108 is transmitted to the timing gear 110b, disposed on the shaft of the rotor 105, engaging the timing gear 110a via a driving gear 109a and an intermediate gear 109b. The phase of the rotational angle of each of the rotors 104 and 105 is adjusted by the engagement between the timing gears 110a and 110b. According to this type of vacuum pump, the gears 110a, 110b, 109a, and the intermediate gear 109b are used to transmit the power of the motor 108 and rotate the rotors 104 and 105 synchronously. Consequently, lubricating oil 111 filled in a mechanical operating chamber accommodating the gears must be supplied to the gears. In addition, a mechanical seal 113 is provided between the mechanical-operating chamber and a fluid-operating chamber 112 accommodating the rotors 104 and 105 so as to prevent the lubricating oil from penetrating into the fluid-operating chamber 112.

The screw type vacuum pump, with the above-described construction, having two rotors, has the following drawbacks:

1). Many gears are required to transmit the power of the motor and rotate the rotors synchronously. Therefore, the vacuum pump comprises many parts and thus its construction is complicated.

2). The synchronous rotation of the rotors is effected due to a sliding contact between gears. Therefore, the rotors cannot be rotated at a high speed and the vacuum pump is large.

3). It is necessary to periodically replace the mechanical seal when it becomes worn. That is, the arrangement is not maintenance-free.

4). Since a large sliding torque applied by the mechanical seal, a large mechanical loss occurs.

(2) Drawback of turbo-molecular pump

Similarly to the roughing vacuum pump, the turbo-molecular pump comprises a construction capable of complying with growing demands for the development of a clean semiconductor-manufacturing process. For example, in the thread groove type turbo-molecular pump having the turbine blade as shown in FIG. 12, the magnetic bearings 155a, 155b, and 156 are used instead of ball bearings which require lubrication. In the turbo-molecular pump, a vacuum is formed in the space accommodating the bearings. Normally, in a vacuum atmosphere, it is difficult to lubricate mechanical parts which slidingly contact a counterpart, but the use of the magnetic bearings eliminates the need for lubrication and, the provision of an oil reservoir such as required in the construction comprising the ball bearings. Therefore, the turbo-molecular pump can be installed in an arbitrary posture on a vacuum chamber. However, the cost of the turbo-molecular pump is much higher than the cost of the vacuum pump comprising the ball bearings because it is necessary to provide the shaft of each rotor of the turbo-molecular pump with an electromagnet, a sensor or a controller as described previously.

(3). Drawbacks of evacuating system (i.e. the roughing vacuum pump of (1) above, plus the turbo-molecular pump of +(2) above)

The conventional roughing vacuum pump (positive-displacement vacuum pump) discharges gas in a viscous flow region, the pressure of which is in the vicinity of atmospheric pressure, but the degree of vacuum obtained by the roughing vacuum pump is not greater than approximately $10^{-1}$ Pa. The conventional turbo-molecular pump generates a degree of vacuum as great as approximately $10^{-8}$ Pa, but is incapable of discharging gas in the viscous flow region, the pressure of which is in the vicinity of atmospheric pressure. In order to overcome this drawback, a vacuum environment is generated in a range of $10^0$ to $10^{-1}$ Pa by the roughing vacuum pump, for example, the above-described screw pump. Thereafter, a predetermined degree of vacuum is generated by the turbo-molecular pump.

With the progress in composite processes for manufacturing semiconductors in recent years, multi-chamber systems have been widely adopted as equipment for manufacturing semiconductors so as to evacuate a plurality of vacuum chambers independently of each other. An evacuating system comprising the roughing vacuum pump and the turbo-molecular pump is required for each chamber in order to adopt the multi-chamber system. But the provision of the evacuating system for each chamber results in a large and complicated evacuating apparatus.

In order to overcome the above-described drawbacks (1) through (3), one of the present inventors has proposed a vacuum pump in U.S. patent application Ser. No. 738,902 which is pending. The vacuum pump comprises a positive-displacement vacuum pump structure section comprising a plurality of rotors and a kinetic vacuum pump structure section disposed on the shaft of one of the rotors. A plurality of shafts of the rotors is electronically controlled so that the shafts rotate synchronously. In this manner, the vacuum pump can generate a vacuum over a wide range from atmospheric pressure to a high vacuum.

SUMMARY OF THE INVENTION

It is an object of the present invention to provide a vacuum pump which can be kept clean, is simple and compact in construction, and has an improved performance in discharging gas in an intermediate flow region and a molecular flow region.

In accomplishing these and other objects of the present invention, according to one aspect of the present invention, there is provided a vacuum pump comprising: a plurality of rotors accommodated in a housing; a plurality of bearings for supporting the shafts of the rotors, respectively; a fluid-suction opening and a fluid-discharge opening formed in the housing; a motor for driving at least one of the rotors; a first pump structure section for suction and discharge of gas, the pressure of which is in a viscous flow region, by utilizing the change in volume of a space formed by the rotors and the housing; and a second pump structure section for transporting gas, the pressure of which is in an intermediate flow region, as well as gas, the pressure of which is lower than a pressure of the intermediate flow region, by utilizing movement of the space from a suction side to a discharge side of the second pump structure section.

BRIEF DESCRIPTION OF THE DRAWINGS

These and other objects and features of the present invention will become clear from the following description taken in conjunction with the preferred embodiments thereof with reference to the accompanying drawings, in which:

FIGS. 7(a), (b), and (c) are views showing principles of operation of the present invention;

FIG. 11 is a sectional view showing a conventional screw type pump;

FIG. 12 is a sectional view showing a conventional turbo-molecular pump; and

FIGS. 13, 14, 15A, 15B, 16 and 17 are schematic descriptive views showing modifications of a positive-displacement pump structure section to be used in the present invention.

DETAILED DESCRIPTION OF THE INVENTION

Figure 1A:
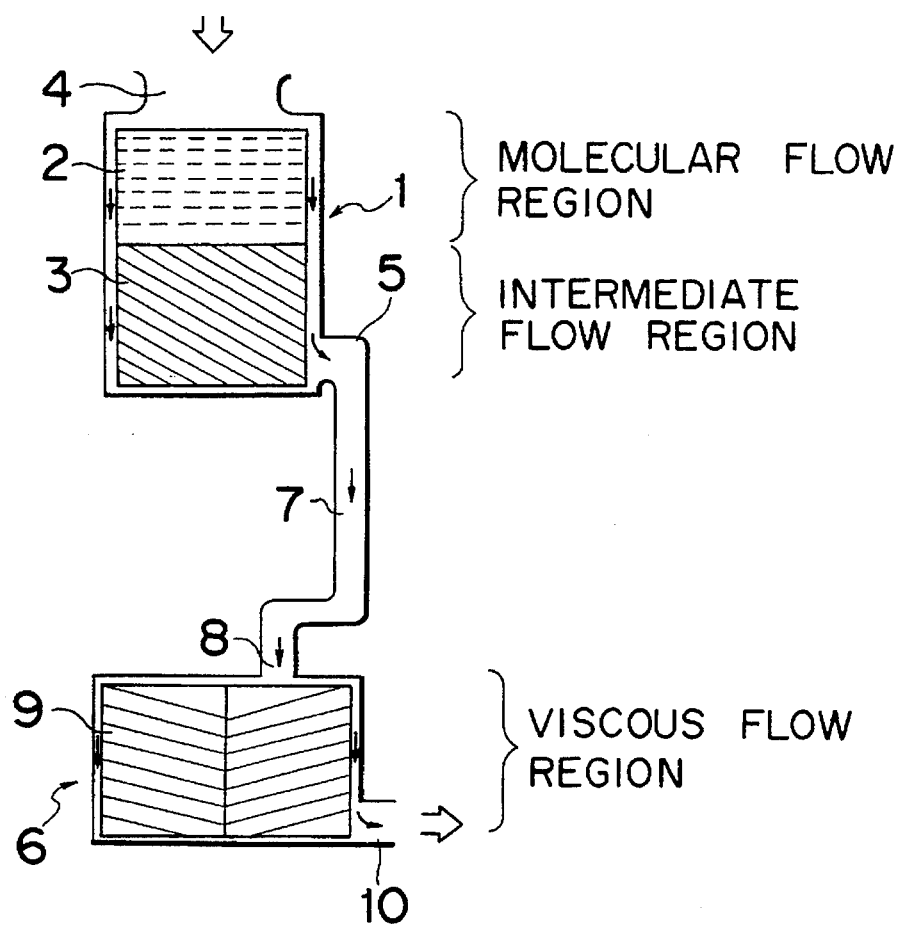
FIG. 1(a) is a view showing the principles of operation of a conventional pump.

Before the description of the present invention proceeds, it is to be noted that like parts are designated by like reference numerals throughout the accompanying drawings.

Before embodiments of the present invention are described, the principles of the present invention is described below.

A vacuum pump according to a first aspect of the present invention comprises: a plurality of rotors accommodated in a housing; a plurality of bearings for supporting the shafts of the rotors, respectively; a fluid-suction opening and a fluid-discharge opening formed in the housing; a motor for driving at least one of the rotors; a first pump structure section for suction and discharge of gas, the pressure of which is in a viscous flow, region by utilizing change in volume of a space formed by the rotors and the housing; and a second pump structure section for transporting gas, the pressure of which is in an intermediate flow region as well as gas, the pressure of which is lower than a pressure of the intermediate flow region, by utilizing movement of the space from a suction side to a discharge side of the second pump structure section. That is, the vacuum pump comprises the positive-displacement pump (first pump) for changing gas from atmospheric pressure to a low vacuum and the positive-displacement pump structure section (second pump), coaxial with the first pump, for changing gas of a low pressure smaller than an intermediate flow region. The vacuum pump according to the first aspect of the present invention is greatly superior in discharge performance and compression ratio to a "kinetic type" pump exploring thread grooves (e.g. a thread groove-employed pump thread groove portion of a turbo-molecular pump) in that gas of a low pressure smaller than the intermediate flow region is transported by the positive-displacement pump. According to the first aspect of the present invention, the vacuum environment is divided into three regions, that is, a low vacuum (viscous flow), intermediate degree of vacuum (intermediate flow), and a high vacuum (molecular flow). In the embodiment to be described later, a low vacuum is greater than 100 Pa; an intermediate degree of vacuum is 100–0.1 Pa; and a high vacuum is smaller than 0.1 Pa in pressure.

The first aspect of the present invention is described below with reference to FIGS. 1(a) and 1(b).

FIG. 1(a) is a model view showing a conventional evacuating system comprising a turbo-molecular pump and a positive-displacement pump. Referring to FIG. 1(a), the evacuating system comprises the turbo-molecular pump 1; a turbine blade 2 of the turbo-molecular pump 1; a thread groove 3; a suction opening 4; a discharge opening 5; a positive-displacement pump 6; a suction opening 8 of the positive-displacement pump 6; a screw groove 9; a pipe 7 for connecting the turbo-molecular pump 1 and the positive-displacement pump 6 with each other; and a discharge opening 10 of the positive-displacement pump 6. Gas flows in the following order and is then discharged to the atmosphere: the suction opening 4→the discharge opening 5→the pipe 7→the suction opening 8→the discharge opening 10.

Figure 1B:
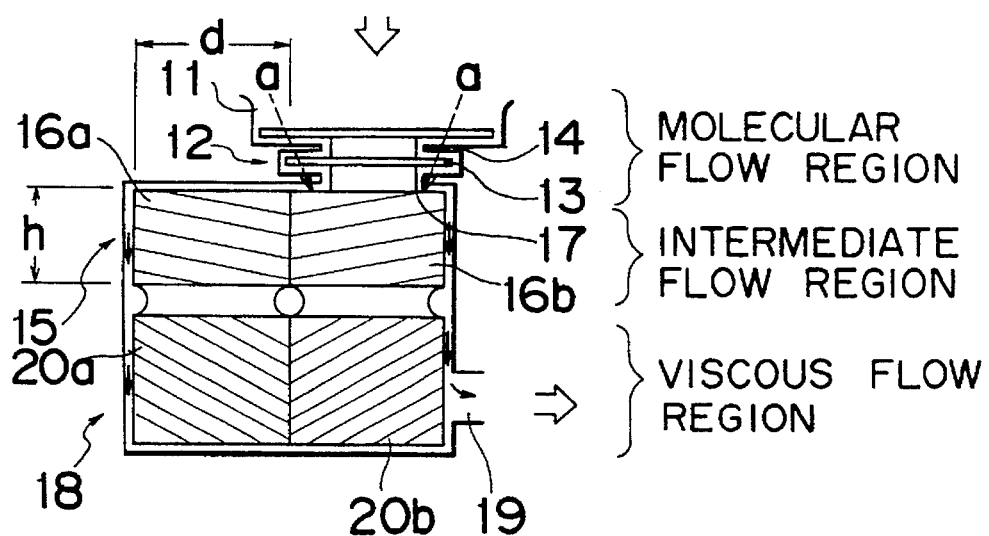
FIG. 1(b) is a view showing the principles of operation of a pump according to a first aspect of the present invention.

FIG. 1(b) is a view showing the principle of the vacuum pump according to the first aspect of the present invention. The vacuum pump comprises the suction opening 11; a third pump structure section 12 of a kinetic type; a bucket 13 of a turbine blade; a stationary a blade 14; a second positive-displacement pump structure section 15; transferring grooves 16a and 16b of the second positive-displacement pump structure section 15; a suction portion 17 of the second positive-displacement pump structure section 15; the first positive-displacement pump structure section 18; the discharge opening 19; and the screw grooves 20a, 20b of the first positive-displacement pump structure section 18. Gas flows in the following order not via a pipe and is then discharged in atmosphere: the suction opening 11→the third pump structure section 12→the second positive-displacement pump structure section 15→the first positive-displacement pump structure section 18→the discharge opening 19.

The performance of the vacuum pump according to the first aspect of the present invention is different from that of the conventional vacuum pump in that:

(1) There is a difference between the principles for transporting under a pressure in the intermediate flow region and in a region below the intermediate flow region.

The conventional turbo-molecular pump 1 is operated on the basis of the transportation principle, namely, the probability theory of applying directivity to the motion of a gas molecule due to collision between the gas molecule and a solid wall. That is, the turbo-molecular pump 1 is operated on the basis of molecular drag action. More specifically, a rotor on which the turbine blade 2 or the thread groove 3 is formed is rotated at a high speed to impart momentum to the gas molecules. According to the vacuum pump of the first aspect of the present invention, as shown in FIG. 1(b), gas, the pressure of which is in the intermediate flow region or the molecular flow region in the vicinity of the intermediate flow region, is transported by the positive-displacement pump in which the rotors rotate as fast as the rotor of the conventional turbo-molecular pump. That is, gas molecules enclosed in a space formed by transferring grooves 16a and 16b (second pump structure section 15) are transported not on the basis of the "probability theory" but on the basis of the "deterministic theory". Consequently, the vacuum pump of the first aspect of the present invention is greatly superior to the conventional vacuum pump in discharging gas, the pressure of which is in the intermediate flow region and the molecular flow region.

(2) There is no pressure loss due to the use of a pipe.

According to the conventional vacuum pump, gas discharged from the turbo-molecular pump 1 is drawn in by the positive-displacement pump 6 via the pipe 7. As a result, pressure loss is generated in the pipe 7. According to the vacuum pump of the first aspect of the present invention, the first vacuum pump 15 and the second vacuum pump 18 are integrally assembled with each other. That is, the vacuum pump generates an extremely high vacuum from atmospheric pressure without pressure loss.

(3) There is a difference between the principles for transporting gas from the molecular flow region to the intermediate region.

Figure 2:
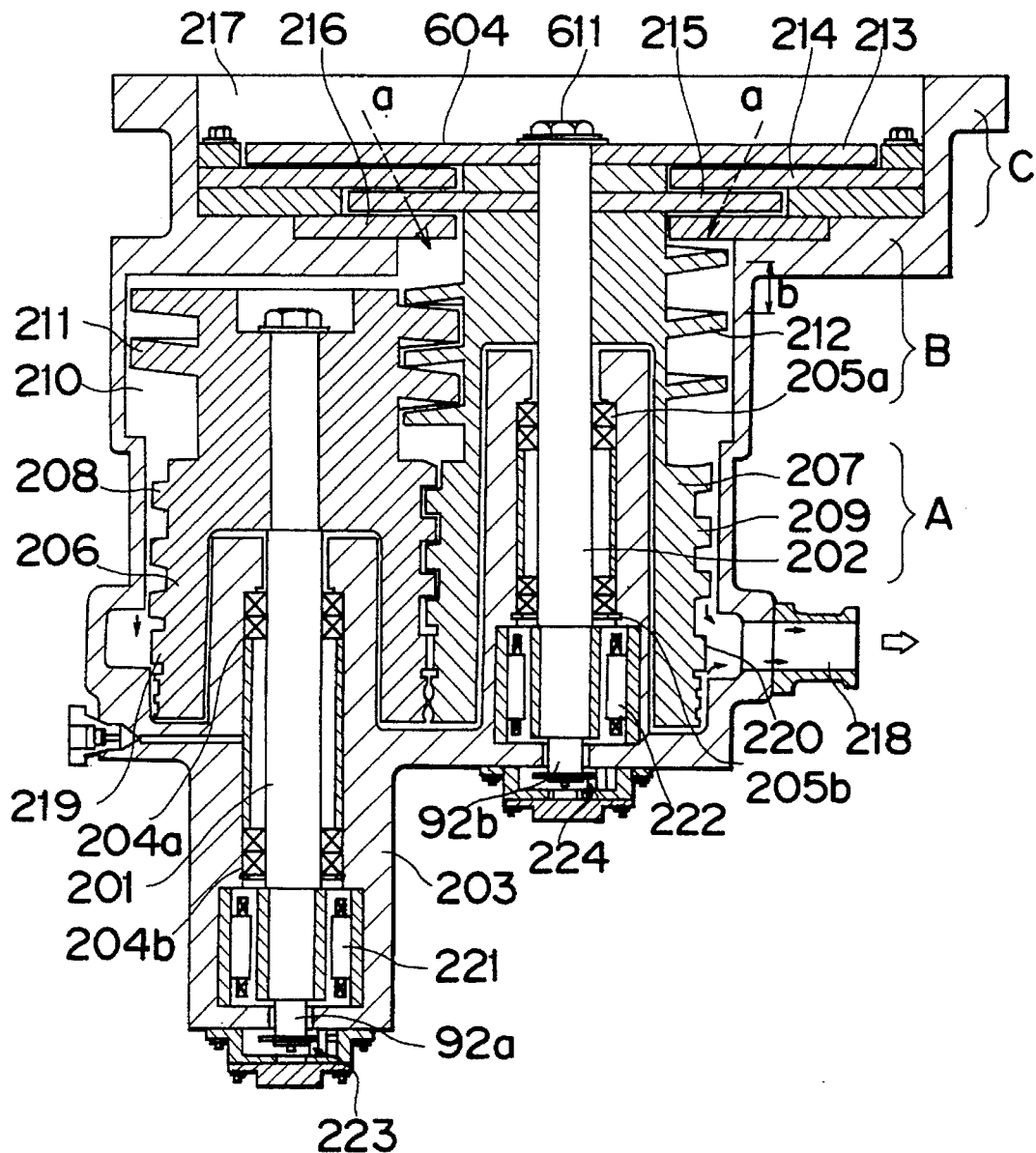
FIG. 2 is a sectional view showing a vacuum pump according to a first embodiment of the present invention.

According to the conventional turbo-molecular pump, it is necessary to pile buckets and stationary blades alternately one on the other in plural stages (7 to 8 stages or more) so as to transport gas molecules to the discharge side and to thereby increase the compression ratio. According to the vacuum pump of this aspect of the present invention, the behavior of gas molecules which pass through the vacuum pump is as follows:

A bucket 13 and a stationary blade 14 of the third pump structure section 12 are shaped so that gas molecules which have collided with the surface thereof flow toward the suction portion 17 of the second positive-displacement pump structure section 15 disposed below the third pump structure section 12 as shown by arrows (a) of FIG. 2. The process starting from the full opening of the suction portion 17 (the state in which most gas molecules are introduced) to the termination of suction (completion of enclosure of gas molecules) is one suction process of the second positive-displacement pump 15.

Gas molecules which have been introduced into the suction portion 17 are enclosed in the space of the second positive-displacement pump 15 instantaneously, i.e., before the rotor rotates 360°. Therefore, according to the vacuum pump of the aspect of the present invention, a small number of the buckets 13 and the stationary blades 14 disposed in the third pump structure section 12 suffices, which simplifies the construction of the vacuum pump.

The means for effectively achieving the above-described characteristics (1) through (3) of the vacuum pump according to the aspect of the present invention has already been proposed in the above U.S. Patent Application as described previously. That is, the synchronous rotation of two rotors performed by electronic control. Since the vacuum pump has no components which mechanically slide against one another, such as transmission gears, the speed of rotation of the rotors can be increased so that the peripheral speed of the rotor is as fast as the flight speed of the gas molecules. Therefore, although the vacuum pump is of positive-displacement type, the gas molecules flying at a high speed can be captured and transported.

The embodiment of the present invention will now be described with reference to the drawings.

Figure 3:
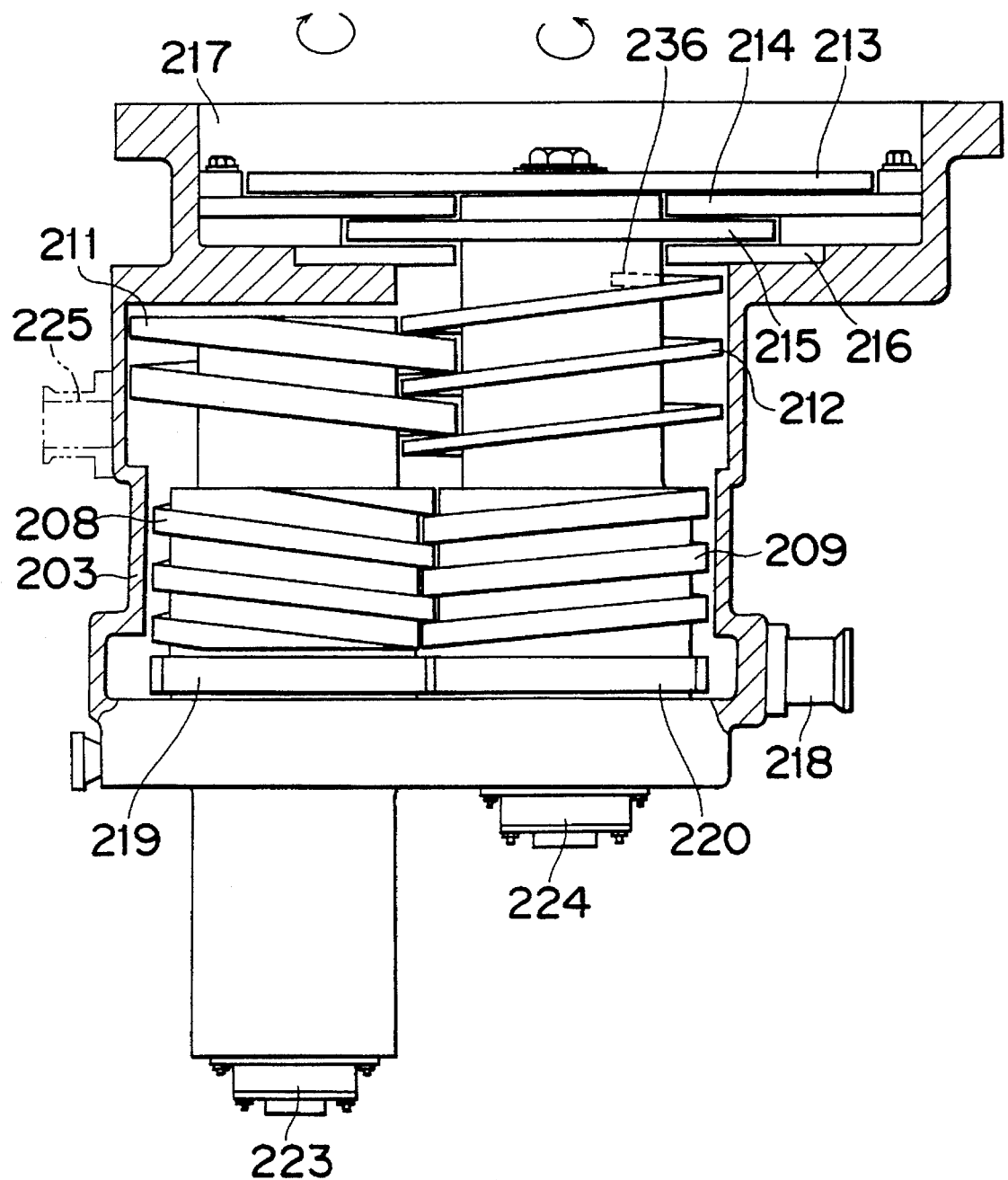
FIG. 3 is a side elevation obtained by opening a part of a housing of the vacuum pump according to the first embodiment.

A vacuum pump according to a first embodiment of the present invention will be described below with reference to FIGS. 2 and 3. A first rotary shaft 201 and a second rotary shaft 202 are supported by bearings 204a, 204b and 205a, 205b accommodated in a housing 203, respectively. The first and second shafts 201 and 202 are inserted into cylindrical rotors 206 and 207, respectively. Thread grooves 208 and 209 as a kind of screw grooves engaging each other are respectively formed on the peripheral surfaces of the rotors 206 and 207. The portion in which the thread grooves 208 and 209 engage each other is denoted as a first positive-displacement pump structure section (A). With the rotation of the first and second shafts 201 and 202, there is a change in the volume of a space defined by the housing 203 and the recess (groove) and projection by which the thread grooves 208 and 209 engage each other. The vacuum pump performs suction and discharge operations due to the volume change. A second positive-displacement pump structure section (B) is formed above the first positive-displacement pump structure section (A) with a cavity 210 sandwiched therebetween. Similarly to the first positive-displacement pump structure section (A), in the second positive-displacement pump structure section (B), a space is formed by the engagement between the projections and recesses of transferring grooves 211 and 212. But the depths of the transferring grooves 211 and 212 of the second positive-displacement pump structure section (B) are greater than those of the thread grooves 208 and 209 of the first positive-displacement pump structure section (A). The width of the recess of the groove 212 formed on the rotor 207 is greater than that of the recess of the groove 211 formed on the rotor 206. Referring to FIG. 3, reference numeral 225 denotes a second suction opening shown by a two-dot chain line; and 236 denotes the end of the groove 212 disposed at the upstream side of the opening portion thereof, which is shown by a chain line.

A third pump structure section (C) comprising buckets 213 and 215 and stationary blades 214 and 216 is formed at an upper portion of the second shaft 202. The bucket 213 disposed highest in the third pump structure section (C) has the largest outer diameter. The stationary blade 214 is the second largest of the four blades in the outer diameter thereof. The bucket 215 is smaller than the stationary blade 214 and greater than the stationary blade 216 in the outer diameter thereof. The outer diameter of the bucket 213 and the opening area of a suction opening 217 are made to be as great as possible to increase the probability of capturing gas molecules. The configuration (inclination of blade or bucket in axial and radial directions) of each blade and each bucket is formed so that gas molecules which have been duced into the vacuum pump from the suction opening 217 are transported in the direction as shown by arrows (a) in FIG. 2. Accordingly, gas which has flowed into the vacuum pump is discharged from a discharge opening 218 via the third pump structure section (C), the second positive-displacement pump structure section (B), and the first positive-displacement pump structure section (A), in that order.

Figure 4:
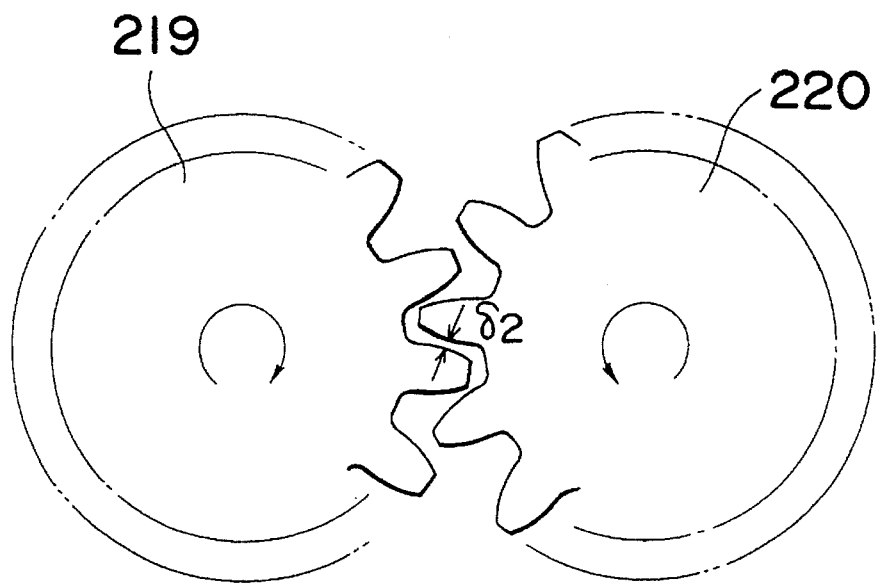
FIG. 4 is a plan view showing contact-preventing gears used in the first embodiment.

Contact-preventing gears 219 and 220, as shown in FIG. 4, for preventing contact between the thread grooves 208, 209 and the transferring grooves 211, 212 are formed on the peripheral surfaces of the lower ends of the rotors 206 and 207, respectively. A solid lubricating film is formed on the contact-preventing gears 219 and 220 so that they can withstand a possible contact between the metal of the contact-preventing gear 219 and that of the contact-preventing gear 220. The backlash $\delta_2$ between a tooth of the contact-preventing gears 219 and the mating tooth of the contact-preventing gears 220 is smaller than the backlash $\delta_1$ (not shown) between a tooth of the groove 208 and the mating tooth of the groove 209 and the backlash $\delta_1$ between a tooth of the groove 211 and the mating tooth of the groove 212. Accordingly, the contact-preventing gears 219 and 220 do not contact each other when the first and second shafts 201 and 202 are rotating synchronously, whereas if they are rotating out of sync, the contact-preventing gears 219 and 220 contact each other before the thread grooves 208 and 209 contact each other and/or the transferring grooves 211 and 212 contact each other. In this manner, the contact-preventing gears 219 and 220 prevent contact between the thread grooves 208 and 209 and contact between the transferring grooves 211 and 212. There may be a possibility that a material cannot be practically processed in such a critical tolerance if the backlashes $\delta_1$ and $\delta_2$ are slight. It is noted, however, that the total leakage amount of fluid during one stroke of the pump is proportional to the period of time required for one process to be completed. Therefore, when the first and second shafts 201 and 202 rotate at high speeds, the performance (ultimate vacuum degree or the like) of the vacuum pump can be sufficiently maintained even though the backlash $\delta_1$ is large in an allowable range. According to the vacuum pump of the present embodiment in which the first and second shafts 201 and 202 can be rotated at high speeds, the backlashes $\delta_1$ and $\delta_2$ having dimensions necessary to prevent contact between the grooves can be obtained even though the backlashes $\delta_1$ and $\delta_2$ are processed with an ordinary accuracy.

Figure 6:
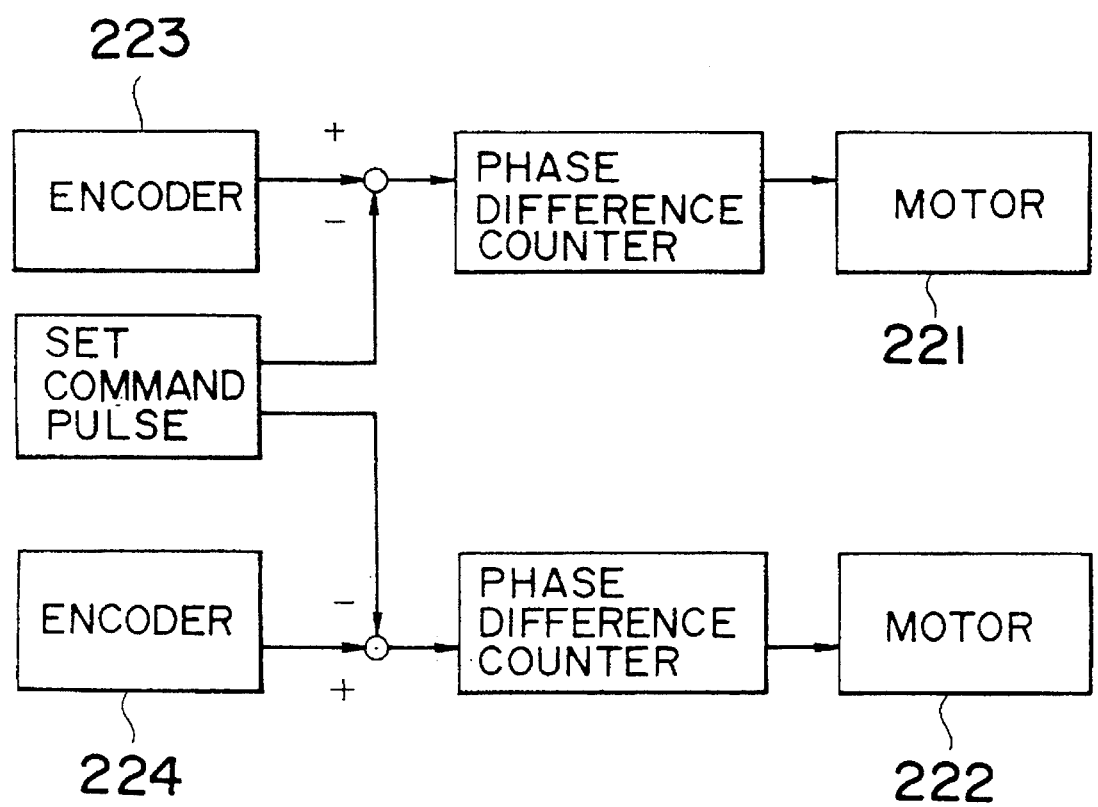
FIG. 6 is a block diagram showing an arrangement for carrying out synchronous rotation.

The rotors 206 and 207 are rotated at high speeds of tens of thousands of times per minute by each of AC servo motors 221 and 222 disposed at lower portions of the first and second shafts 201 and 202, respectively, with the ratio between the speeds of rotation of the rotors 206 and 207 determined by the ratio between the outer diameters thereof maintained at a constant ratio. The PLL control of the first and second shafts 201 and 202 is effected by a method shown by a block diagram in FIG. 6. Rotary encoders 223 and 224 are disposed at the lower ends of the first and second shafts 201 and 202, respectively, as shown in FIG. 2. The output pulses of the rotary encoders 223 and 224 are compared with a set command pulse, namely, a target value set for an assumed rotor. A phase difference counter calculates the deviation between the target value and each output value, namely, each speed of rotation of the first and second shafts 201 and 202 and each rotational angle thereof. Based on the calculated result, the rotation of each of the servo motors 221 and 222 is controlled by eliminating the deviation.

Figure 5:
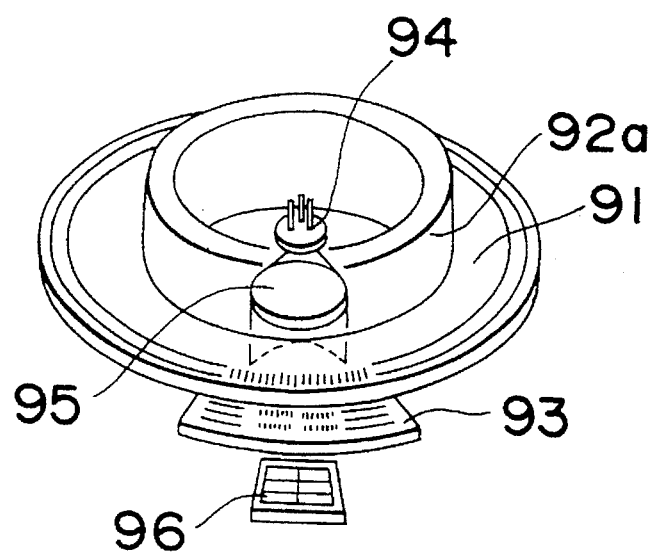
FIG. 5 is a perspective view showing a laser type encoder used in the first embodiment.

As the rotary encoders 223 and 224, magnetic encoders or conventional optical encoder may be used. In this embodiment, laser type encoders, having high resolution and high speed response, and operated by utilizing diffraction and interference of light, are used. FIG. 5 shows an example of the laser type encoders. A moving slit plate 91 having a plurality of slits circumferentially formed thereon is rotated by shafts 92a and 92b connected with the first and second shafts 201 and 202, respectively. A fixed slit plate 93 opposed to the moving slit plate 91 has slits arranged in the configuration of a fan. Light emitted by a laser diode 94 passes through a collimator lens 95 and is then received by a light-receiving element 96 through the slits of each of the slit plates 91 and 93.

As described above, the synchronous rotation of the rotors 206 and 207 is performed by controlling the rotational angle of each rotor and the speed of rotation thereof so that the thread grooves 208 and 209 do not contact each other and the transferring grooves 211 and 212 do not contact each other. Instead of this method, the synchronous rotation of the rotors 206 and 207 may be controlled by making the torque of one of the motors a little smaller than that of the other motor so that a small torque is applied to the timing gears. The fluid-rotating apparatus according to the embodiment may be applied to an air-conditioning compressor. The first and second positive-displacement pump structure sections (A) and (B) (corresponding to 206 and 207 of FIG. 2) formed on the rotor disposed in the rotary portion of the fluid-rotating apparatus may be comprised of the Roots type as shown in FIG. 13, the gear type as shown in FIG. 14, the single lobe or double lobe type as shown in FIGS. 15A and 15B, the screw type as shown in FIG. 16, or the outer circumferential piston type as shown in FIG. 17. A centrifugal pump having one rotor or a viscosity pump may be used as the first pump structure section. When a viscosity pump is used as the second pump structure section, a spiral groove having a small depth is formed on the periphery of the rotor in the embodiment. Such a groove may be formed on the static side which is the surface confronting the rotor. The viscosity pump may be shaped in any suitable configuration except for cylindrical. For example, multistage thrust circular plates may be superposed on each other and a groove may be formed on the surface of each plate so that fluid flows in the radial direction. In the fluid-rotating apparatus according to the embodiment, the synchronous rotation of the rotors 206 and 207 is electronically controlled as disclosed in U.S. patent application Ser. No. 738,902. Consequently, the fluid-rotating apparatus has the following features. That is, although the vacuum pump of the embodiment is of a positive-displacement type, it has no timing gears which slidingly contact each other, unlike the conventional screw pump. In addition, since each rotor is driven by an independent motor, the vacuum pump is not provided with a power transmitting mechanism comprising gears. It is necessary for the positive-displacement pump and the compressor to have a space, the volume of which is changed by the relative motion of two or more rotors. To this end, conventionally, two or more rotors are synchronously rotated by a complicated transmission mechanism comprising the combination of transmitting gears and timing gears or the combination of a link mechanism and a cam mechanism. The rotors can be rotated synchronously at high speeds to a certain extent by lubricating the timing gears and the transmission mechanism, but the speeds of rotation of the rotors cannot be more than 10,000 rpm because it is necessary to take the vibration, noise, and reliability of the fluid-rotating apparatus into consideration. On the other hand, in the vacuum pump according to the embodiment, it is unnecessary to provide the vacuum pump with a complicated mechanism including parts which mechanically slide against each other as described previously. Therefore, the rotary portion of each rotor can be rotated above 10,000 rpm, and the construction of the fluid-rotating apparatus can be simplified because it is not provided with a complicated transmission mechanism. In addition, there is no torque loss because the vacuum pump does not comprise an oil seal, namely, a mechanism subjected to a mechanical sliding contact, and thus, it is unnecessary to replace the oil seal or oil. The power of the vacuum pump is the product of the torque and the speed of rotations of the rotor (rotary shaft). Thus, with the increase in the speed of rotation of the rotor, the torque becomes small, which allows for the miniaturization of the motor. Further, according to the embodiment, since each rotor is driven by an independent motor, the torque required for each motor can be further reduced. These advantages allow the construction of a built-in type motor, i.e., each motor is incorporated in the corresponding rotor. Hence, a compact, light, and space-saving fluid-rotating apparatus can be manufactured.

In addition to the above-described features of the vacuum pump already proposed in the U.S. patent application Ser. No. 738,902 and the vacuum pump according to the embodiment, the vacuum pump according to the embodiment has the following effects:

1). The vacuum pump provides a greatly improved discharge performance of gas, the pressure of which is lower than the intermediate flow region.

As described previously, the operation of the conventional turbo-molecular pump is based on a probabilistic transportation principle (molecular drag action) that directivity is imparted to gas molecules by collisions between gas molecules and a solid wall (thread groove). In this transportation principle, when gas molecules are reflected by a moving wall, a velocity component of the moving wall in the moving direction thereof is applied to the gas molecules which have collided with the moving wall. However, when the gas being transported approaches the viscous flow region (low vacuum), the frequency of collisions between gas molecules is larger than that of collisions between gas molecules and the solid wall. In order to obtain a molecular drag action effectively, it is necessary to make the depth of the thread groove (of the screw type pump) small. Therefore, the conventional turbo-molecular pump has a limitation in the transportation amount of gas (discharge performance). On the other hand, the vacuum pump of the embodiment comprises the positive-displacement pump which rotates at the same speed (approximately the same order as the flight speed of gas molecules) as that of the conventional turbo-molecular pump so as to transport gas, the pressure of which is in the intermediate flow region and the vacuum region lower than the intermediate flow region. In the "positive-displacement" pump which forcibly encloses gas molecules therein, there is no limitation as to the groove depth (volume of space) in principle. Accordingly, supposing that the diameter and speed of rotation of the rotor of the conventional turbo-molecular pump are equal to those of the rotor of the vacuum pump according to the embodiment, the latter has a much higher discharge performance than the former.

In the case of the conventional turbo-molecular pump, a compression ratio is determined by the ratio between the following (1) and (2): That is, (1) is the transportation probability from the suction side to the discharge side, and (2) is the transportation probability from the discharge side to the suction side (reverse flow). On the other hand, according to the positive-displacement pump of the embodiment, (2) can be made to approach zero in principle by making small the space between the housing 203 and the transferring groove 211 as well as the transferring groove 212 and the space between the transferring grooves 211 and 212. In this respect, the vacuum pump of the embodiment is capable of greatly improving the compression ratio.

2). No pressure loss is generated by a pipe.

According to the conventional evacuating system comprising the turbo-molecular pump and the positive-displacement pump, a pipe connecting both pumps causes pressure loss and thus it is necessary to set the discharge amount of both pumps to a greater value. Since the vacuum pump in accordance with the embodiment has the functions of both pumps, it does not generate a pressure loss.

3). The vacuum pump greatly improves the discharge performance of gas, the pressure of which is in the molecular flow region.

The transportation efficiency in the molecular flow region can be improved by forming a molecular pump (third pump structure section (C)) comprising the turbine blade on the shaft of one of the rotors of the vacuum pump in accordance with the embodiment. The buckets 213 and 215 of the third pump structure section (C) and those of the stationary blades 214 and 216 thereof are shaped so that gas molecules which have collided with the surface thereof flow toward the neighborhood of the suction opening of the second positive-displacement pump structure section (B) disposed below the third pump structure section (C), i.e., so that gas molecules flow in the direction shown by the arrows (a) in FIG. 2. The larger is the outer diameter of the turbo-molecular pump is, the higher is the probability of catching gas molecules. However, in consideration of the balance in the discharge performance between both pumps, normally, the outer diameter of the positive-displacement pump structure section is set to be smaller than that of the turbo-molecular pump structure section. The buckets 213 and 215 and the stationary blades 214 and 216 are shaped so that gas molecules flow toward the center of the pump as shown by the arrows (a) of FIG. 2. In this manner, gas molecules can be caused to flow smoothly from the upstream side to the downstream side between the pump structure sections (B) and (C). Further, gas molecules which have reached the vicinity of the suction opening of the second positive-displacement pump structure section (B) by the action of the buckets and the stationary blades of the third pump structure section (C) are enclosed in the space of the second positive-displacement pump structure section (B) for the reason described below.

Referring to FIG. 7, a bucket 500 of the third pump structure section (C) moves to the right at a speed (V). Reference numeral 501 denotes a transferring groove of the second positive-displacement pump structure section (B), and 502 denotes the neighborhood of the suction opening of the second positive-displacement pump structure section (B). Reference numeral 226 denotes the end of the transferring groove 501.

Figure 8:
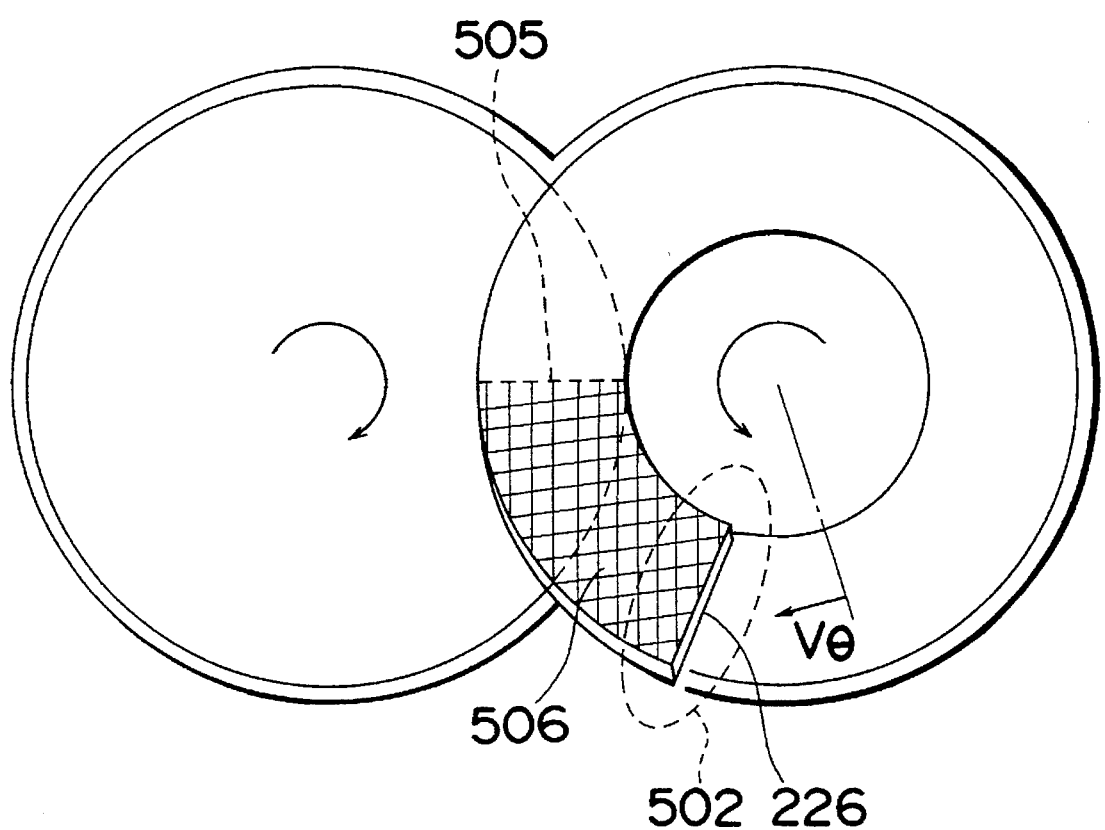
FIG. 8 is a plan view showing a pump for transporting gas, the pressure of which is in an intermediate degree of vacuum.

A gas molecule has a velocity distribution in conformity with the Maxwellian velocity distribution and thus the velocity vectors thereof are equal to each other in every direction as shown in FIG. 7(a). When the velocity vectors are viewed in the direction from the bucket 500, the distribution is deformed to the extent of resulting in a relative speed (V) as shown in FIG. 7(b). Considering molecules which fly into the row of the buckets, only molecules having velocity vectors perpendicular to the suction opening of the row of the buckets fly into the suction side. As a result, the distribution of the velocity vectors thereof is as shown in FIG. 7(c). Supposing that the velocity vector of the gas molecule which has passed through the row of the buckets is divided into a circumferential component (Vθ) and an axial component (Vz), molecules having the circumferential component (Vθ) reliably fly from the vicinity 502 of the suction opening into a suction portion 506, shown by a cross hatching in FIG. 8, formed by the transferring groove 501, the housing 504, and the sealing portion 505. The sealing portion 505 is formed by the engagement between the transferring grooves 211 and 212. The suction portion 506 becomes enclosed before the rotor subsequently makes one full rotation, thus enclosing gas molecules therein. Gas molecules enclosed in the space of the second positive-displacement pump structure section (B) do not flow back to the third pump structure section (C). The second positive-displacement pump structure section (B) functions as a check valve for preventing the back flow of gas molecules. Accordingly, the vacuum pump of the present invention allows the construction of the kinetic pump structure section (the third pump structure section (C)) to be greatly simplified. For example, the number of buckets and blades can be decreased supposing that the conventional vacuum pump and the vacuum pump of the present invention discharge an equal amount of gas.

In the first embodiment, the turbo-molecular pump comprising the turbine blade is disposed on the upstream side of the second positive-displacement pump structure section (B) in order to obtain a high vacuum. The turbine blade may be replaced with the conventional thread groove.

When the pump structure section for discharging gas of a high vacuum comprises a thin turbine blade, and the rotor is rotated at a high speed, there is a possibility that the turbine blade will be damaged due to the generation of dynamic lift when the suction side of the pump is still at a high pressure. But the turbine blade will not be damaged by the second suction opening 225, as shown by a two-dot chain line in FIG. 3, formed by the method disclosed in the above-described U.S. patent application.

Gas molecules can be more effectively introduced into the vicinity 502 of the suction opening by shaping the turbine blade of the third pump structure section (C) into a "mixed flow fan".

A pulse motor capable of rotating the rotors at high speeds may be used instead of the AC servo motor, which performs a control for rotating the rotors synchronously, used in the first embodiment.

In the first embodiment, the transferring grooves 211 and 212 formed on the rotors 206 and 207, respectively are non-symmetrical. The opening area of the end 236 of the transferring groove 212 can be increased by making the width of the transferring groove 212 formed on the side larger than that of the transferring groove 211. This construction enables gas molecules to be effectively enclosed in the space of the second positive-displacement pump structure section (B). Since the second pump is the second positive-displacement vacuum pump structure section (B), a large gap between the two rotors or a large gap between the rotor and the housing may be formed by sufficiently performing a high transportation probability as compared with conventional kinetic vacuum pumps. A plurality of ends 226 of the transferring grooves can be formed in the opening on the upstream side of the second positive-displacement pump structure section (B) by forming the transferring groove on the rotor in the form of "a multiple thread" as formed in a screw type compressor. As a result, the probability for capturing gas molecules increases and thus the pump is capable of operating with a higher efficiency.

Figure 9:
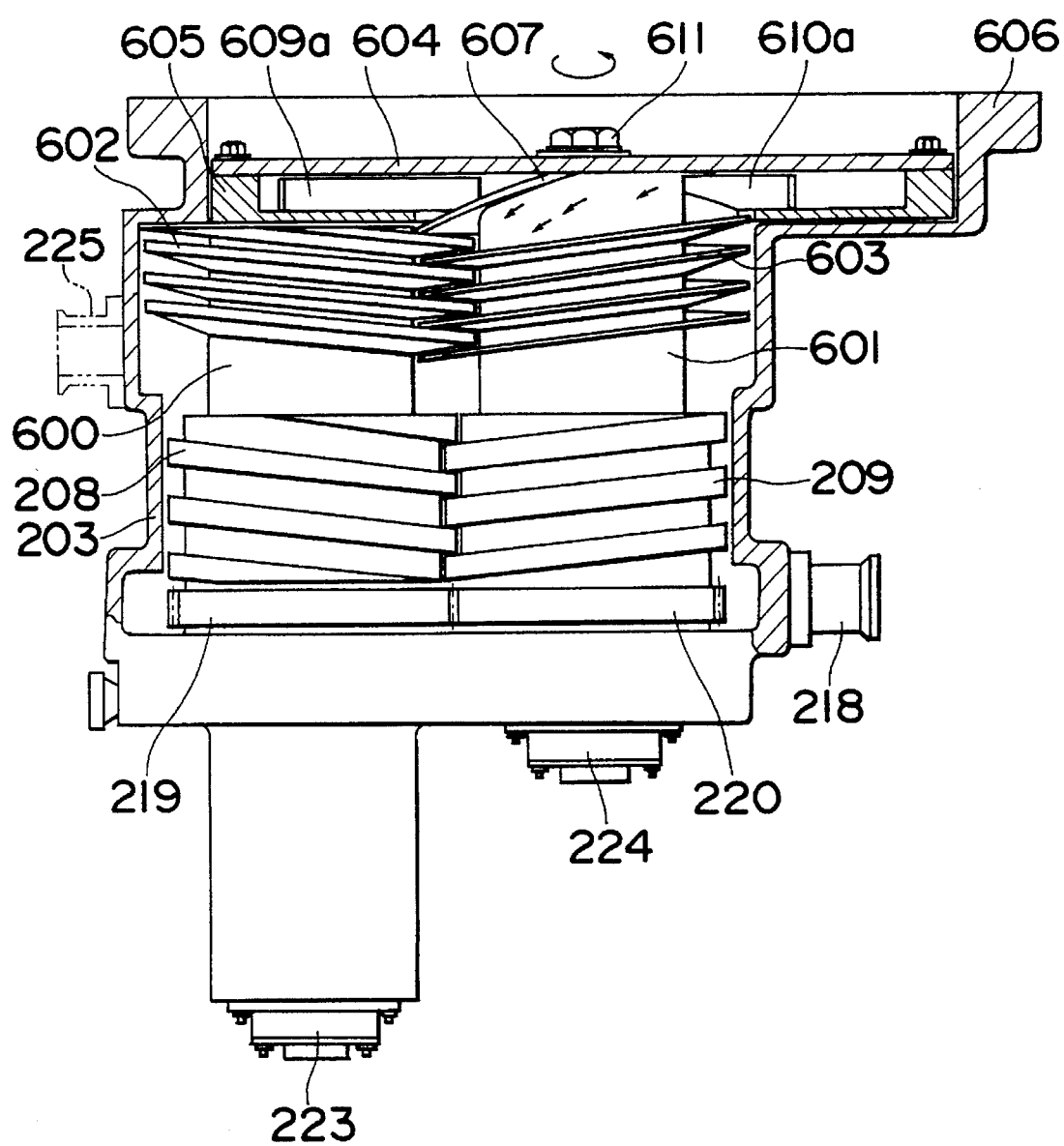
FIG. 9 is a side elevation obtained by opening a part of a housing of a vacuum pump according to a second embodiment.
Figure 10:
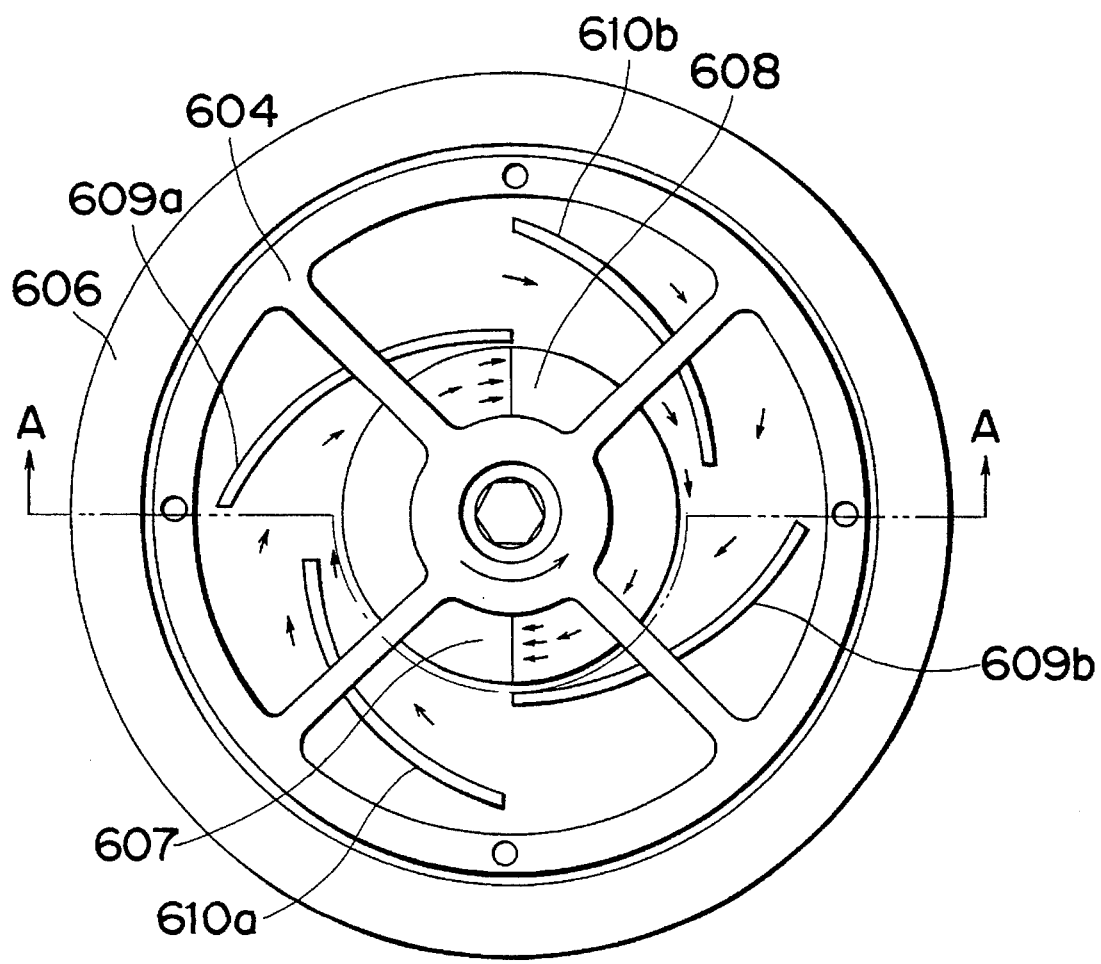
FIG. 10 is a front view showing a suction opening portion of the vacuum pump of FIG. 9.

A second embodiment will be described below with reference to FIGS. 9 and 10. In the second embodiment, the transferring groove is formed as a double-thread screw. The drawing in the vicinity of the end 607 of a transferring groove shown in FIG. 9 is a sectional view taken along a line A—A of FIG. 10. The vacuum pump comprises rotors 600 and 601; transferring grooves 602 and 603 formed on the rotors 600 and 601, respectively; a rotary bridge 604 fixed to the upper end of the rotary shaft 202 by a bolt 611; a rotary disk 605 fixed to the rotary bridge 604; and a flange 606 of a suction opening. Referring to FIG. 10, spiral blades 607 and 608 introduce gas molecules to the ends 607 and 608 of the transferring grooves effectively.

The formation of the spiral blades for transporting gas in the radial direction of the shaft allows for an efficient transportation of gas, the pressure of which is smaller than an intermediate degree of vacuum. Each spiral blade may be composed of a plurality of a shorter turbine blades.

In the Roots type vacuum pump, when a certain amount of working fluid is discharged therefrom per rotation of the rotor, pulsation occurs, whereas in the positive-displacement vacuum pump structure section in which the rotor has a thread groove (including a screw groove) formed on the peripheral surface thereof, the flow of working fluid is almost continuous. As a result, the fluctuation of torque applied to the motor of each rotary shaft is small. The fluctuation of torque causes non-synchronous rotation of the rotary shafts, but the thread groove formed on the peripheral surface of the rotor not causing a large fluctuation of torque facilitates the control for synchronously rotating the shafts at a high speed and with high accuracy. In the structure of the vacuum pump comprising the thread groove, the space between the suction side and the discharge side is closed by a plurality of projections and recesses. Therefore, a bad influence caused by internal leakage can be reduced and thus a high vacuum can be obtained. Unlike the gear type rotor or the Roots type rotor, in the case of a thread groove type rotor, the section of the rotor perpendicular to the rotary shaft is almost circular and hence a cavity can be formed from the center of the rotor toward the vicinity of the periphery thereof. Therefore, the vacuum pump provides a large space therein. The space can be utilized as a bearing portion and thus a compact apparatus can be manufactured.

As apparent from the foregoing description, the vacuum pump in accordance with the present invention provides the following effects.

1). The vacuum pump greatly improves the discharge performance of gas, the pressure of which is lower than the pressure of the intermediate flow region.

2). No pressure loss is generated due to the use of a pipe.

3). The vacuum pump greatly improves the discharge performance of gas, the pressure of which is in the molecular flow region.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A vacuum pump comprising:
   a housing having a fluid suction opening and a fluid discharge opening formed therein;
   a plurality of rotors rotatably mounted in said housing, each of said rotors having a rotor shaft;
   a plurality of bearings rotatably supporting said rotor shafts;
   at least one motor operably coupled with at least one of said rotors for rotatably driving at least one of said rotors;
   wherein said housing, said rotors, said bearings and said at least one motor constitute at least a first positive displacement pump structure section and a second positive displacement pump structure section operably communicated with said first positive displacement pump structure section;
   wherein said first positive displacement pump structure section constitutes a means for suction and discharge of gas having a pressure level in a viscous flow range by utilizing movement of a first gas accommodating closed space defined by said housing and said rotors;
   wherein said second positive displacement pump structure section includes a suction side and a discharge side and constitutes a means for transporting gas having a pressure level in an intermediate flow range, and for transporting gas having a pressure level below the intermediate flow range, toward said first positive displacement pump structure section by utilizing movement of a second gas accommodating closed space defined by said housing and said rotors from said suction side toward said discharge side of said second positive displacement pump structure section; and
   wherein said second gas accommodating closed space is greater in volume than said first gas accommodating closed space.

2. A vacuum pump as recited in claim 1, wherein
   said at least one motor comprises a plurality of motors respectively operably coupled with said rotors; and
   a detecting means is provided for detecting one of a rotational angle and a speed of rotation of each of said motors, and for outputting signals for use in controlling said rotors to rotate synchronously.

3. A vacuum pump as recited in claim 1, wherein
   one of screw grooves and thread grooves are formed on a peripheral surface of each of said rotors.

4. A vacuum pump as recited in claim 1, wherein
   said second pump structure section comprises a first gas transporting groove formed on a periphery of one of said rotors, and a second gas transporting groove formed on a periphery of another of said rotors; and
   a width of said second gas transporting groove is greater than a width of said first gas transporting groove.

5. A vacuum pump as recited in claim 1, wherein
   said housing, said rotors, said bearings and said at least one motor further constitute a third pump structure section having a suction side and a discharge side, said discharge side of said third pump structure section being operably communicated with said suction side of said second positive displacement pump structure section, said third pump structure section comprising a kinetic type pump means for applying momentum to gas molecules to introduce the gas molecules into the suction side of said second positive displacement pump structure section.

6. A vacuum pump as recited in claim 5, wherein
   said housing includes an opening portion disposed between said discharge side of said third pump structure section and said suction side of said second positive displacement pump structure section; and
   said kinetic type pump means of said third pump structure section is operable to cause gas molecules which have been introduced into said third pump structure section to flow toward said opening portion.

7. A vacuum pump as recited in claim 1, wherein
   said first positive displacement pump structure section comprises a first gas moving groove formed on a periphery of at least one of said rotors;
   said second positive displacement pump structure section comprises a second gas moving groove formed on a periphery of at least one of said rotors; and
   a depth of said second gas moving groove is greater than a depth of said first gas moving groove.

8. A vacuum pump as recited in claim 7, wherein
   each of said first and second gas moving grooves comprises one of a screw groove and a thread groove.

9. A vacuum pump as recited in claim 7, wherein
   said first positive displacement pump structure section comprises a first gas moving groove formed on a periphery of each of two of said rotors; and
   said second positive displacement pump structure section comprises a second gas moving groove formed on a periphery of each of two of said rotors.

10. A vacuum pump comprising:

a housing having a fluid suction opening and a fluid discharge opening formed therein;

a plurality of rotors rotatably mounted in said housing, each of said rotors having a rotor shaft;

a plurality of bearings rotatably supporting said rotor shafts;

at least one motor operably coupled with at least one of said rotors for rotatably driving at least one of said rotors;

wherein said housing, said rotors, said bearings and said at least one motor constitute at least a first positive displacement pump structure section and a second positive displacement pump structure section operably communicated with said first positive displacement pump structure section;

wherein said first positive displacement pump structure section constitutes a means for suction and discharge of gas having a pressure level in a viscous flow range, which includes gas pressures above about 100 Pa, by utilizing movement of a first gas accommodating closed space defined by said housing and said rotors;

wherein said second positive displacement pump structure section includes a suction side and a discharge side and constitutes a means for transporting gas having a pressure level in an intermediate flow range, which includes gas pressures from about 100 Pa to about 0.1 Pa, and for transporting gas having a pressure level below the intermediate flow range, toward said first pump structure section by utilizing movement of a second gas accommodating closed space defined by said housing and said rotors from said suction side toward said discharge side of said second positive displacement pump structure section; and wherein said second gas accommodating closed space is greater in volume than said first gas accommodating closed space.

11. A vacuum pump as recited in claim 10, wherein said second pump structure section comprises a first gas transporting groove formed on a periphery of one of said rotors, and a second gas transporting groove formed on a periphery of another of said rotors; and a width of said second gas transporting groove is greater than a width of said first gas transporting groove.

12. A vacuum pump comprising:

a housing having a fluid suction opening and a fluid discharge opening formed therein;

a plurality of rotors rotatably mounted in said housing, each of said rotors having a rotor shaft;

a plurality of bearings rotatably supporting said rotor shafts;

at least one motor operably coupled with at least one of said rotors for rotatably driving at least one of said rotors;

wherein said housing, said rotors, said bearings and said at least one motor constitute at least a first pump structure section and a second pump structure section operably communicated with said first pump structure section;

wherein said first pump structure section constitutes a means for suction and discharge of gas having a pressure level in a viscous flow range by utilizing volume change of a first gas accommodating space defined by said housing and said rotors;

wherein said second pump structure section includes a suction side and a discharge side and constitutes a means for transporting gas having a pressure level in an intermediate flow range, and for transporting gas having a pressure level below the intermediate flow range, toward said first pump structure section by utilizing volume change of a second gas accommodating space defined by said housing and said rotors from said suction side toward said discharge side of said second pump structure section;

wherein said second gas accommodating space is greater in volume than said first gas accommodating space; and wherein said housing, said rotors, said bearings and said at least one motor further constitute a third pump structure section having a suction side and a discharge side, said discharge side of said third pump structure section being operably communicated with said suction side of said second pump structure section, said third pump structure section comprising a kinetic type pump means for applying momentum to gas molecules to introduce the gas molecules into the suction side of said second pump structure section.

13. A vacuum pump as recited in claim 12, wherein said housing includes an opening portion disposed between said discharge side of said third pump structure section and said suction side of said second pump structure section; and said kinetic type pump means of said third pump structure section is operable to cause gas molecules which have been introduced into said third pump structure section to flow toward said opening portion.

14. A vacuum pump comprising:

a housing having a fluid suction opening and a fluid discharge opening formed therein;

a plurality of rotors rotatably mounted in said housing, each of said rotors having a rotor shaft;

a plurality of bearings rotatably supporting said rotor shafts;

at least one motor operably coupled with at least one of said rotors for rotatably driving at least one of said rotors;

wherein said housing, said rotors, said bearings and said at least one motor constitute at least a first positive displacement pump structure section and a second positive displacement pump structure section operably communicated with said first positive displacement pump structure section;

wherein said first positive displacement pump structure section constitutes a means for suction and discharge of gas having a pressure level in a viscous flow range by enclosing gas in a first gas accommodating space defined by said housing and said rotors and effectively moving said first gas accommodating space and the gas enclosed therein;

wherein said second positive displacement pump structure section includes a suction side and a discharge side and constitutes a means for transporting gas having a pressure level in an intermediate flow range, and for transporting gas having a pressure level below the intermediate flow range, toward said first positive displacement pump structure section by enclosing gas in a second gas accommodating space defined by said housing and said rotors and effectively moving said second gas accommodating space and the gas enclosed therein from said suction side toward said discharge side of said second positive displacement pump structure section;

wherein said second gas accommodating space is greater in volume than said first gas accommodating space.

15. A vacuum pump as recited in claim 14, wherein
said second pump structure section comprises a first gas transporting groove formed on a periphery of one of said rotors, and a second gas transporting groove formed on a periphery of another of said rotors; and a width of said second gas transporting groove is greater than a width of said first gas transporting groove.

* * * * *